United States Patent [19]

Yoshitake

[11] Patent Number: 5,008,864
[45] Date of Patent: Apr. 16, 1991

[54] PORTABLE RADIO TELEPHONE DEVICE

[75] Inventor: Kunitoshi Yoshitake, Hyogo, Japan

[73] Assignee: Mitsubishi Denki Kabushiki Kaisha, Tokyo, Japan

[21] Appl. No.: 571,810

[22] Filed: Aug. 24, 1990

[30] Foreign Application Priority Data

Feb. 15, 1990 [JP] Japan ................................. 2-34659

[51] Int. Cl.⁵ .................... G04B 47/00; H04M 1/05
[52] U.S. Cl. ...................................... 368/10; 368/13; 368/282; 379/430
[58] Field of Search ...................... 368/1, 4, 10, 12, 13; 379/430; 455/89–90; 181/20

[56] References Cited

U.S. PATENT DOCUMENTS 3,916,312 10/1975 Campbell .............................. 455/89
4,002,897 1/1977 Kleinmann et al. ................. 455/612
4,090,042 5/1978 Larkin ................................. 379/430
4,847,818 1/1989 Olsen ..................................... 368/10

Primary Examiner—Vit W. Miska
Attorney, Agent, or Firm—Rothwell, Figg, Ernst & Kurz

[57] ABSTRACT

A portable radiotelephone device in which a radio device body is mounted in form of a wristwatch on an arm by means of a carrying strap. An antenna, a power source and a voice transmission tube are provided on the carrying strap separately from and independently of the radio device body. With this, there is provided a portable radiotelephone device which can realize miniaturization of the entire device and enhancement of productivity, and which can obtain a sending speech mouth piece and an ear piece securing a spacing between the ear and the mouth during telephone conversation which has a high antenna efficiency and while preventing feedback between sending speech sound and receiving sound.

4 Claims, 5 Drawing Sheets

2

PORTABLE RADIO TELEPHONE DEVICE

BACKGROUND OF THE INVENTION

1. Field of the Invention

This invention relates to a portable radiotelephone device carried in the form of a wristwatch.

2. Description of the Prior Art

FIG. 1 shows an external perspective view of a conventional portable radiotelephone device. In FIG. 1, a portable radiotelephone device indicated at 51 comprises a retractable antenna 51a, a receiver 51b, a transmitter 51c, a display 51d, various operating keys 51e, and a buzzer 51f notifying the subscriber of a reception from another telephone. Reference numeral 52 designates a battery pack; 53 is a coaxial cable connected to the portable radiotelephone device 51 through a jack 53a; 55 is a battery connected to the portable radiotelephone device 51 through the cable 53 and a dropper 57; and 56 is an antenna connected to the portable table radiotelephone through the cable 53.

The operation of the above-described device will be described hereinafter. In making a telephone call with the portable radiotelephone device 51, the antenna 51a is pulled out, and the telephone number of the called party is inputted by operating the keys on the operating portion 51e. The display 51 displays the called number so as to indicate whether the correct number was dialed or not. A transmitter key (not shown) on the operating portion 51e is depressed, and a caller waits till the other party is called. When a telephone circuit is completed in the above-described operation, a caller can carry on voice communication with the other party.

Even when the antenna 51a is retracted, a telephone conversation can be carried out in case of a strong electric field since a built-in antenna (not shown) is provided in the portable radiotelephone device 51. However, if the antenna 51a is extended, conversation can be had even in the presence of a weak electric field.

When another party calls, the buzzer 51f sounds to notify the subscriber of a reception of call. The receiver 51b is not used to generate a call sound so as to prevent a loud noise in the ear of a user.

A connector (not shown) is provided on the bottom of the portable radiotelephone device 51 as described above. The jack 53a is plugged into the connector whereby the battery 55, which can be of large capacity, is connected to the portable radiotelephone device 51 to supply electric power thereto or to charge the battery pack 52. The antenna 56, connected to the portable radiotelephone device 51 through the cable 53, is used when the portable radiotelephone 51 is used in a vehicle.

The above-described arrangement is designed to have a transmission output on the order of 0.6–1.0 W in a conventional cellular type service area. Radiotelephone 51 can be used in the same manner as a handset of a conventional telephone.

In the conventional portable radiotelephone device, the antenna 51a and the battery pack 52 are integrally provided, and the buzzer 51f is provided separately from the receiver 51b in order to increase a call sound so that the telephone may be used in the manner of a handset. Therefore, there arises a problem in that the whole configuration is larger than desirable for an ideal portable radiotelephone device, and in addition, operation of the radiotelephone is awkward, especially when used by the operator of a vehicle.

On the other hand, with recent rapid progress in the microelectronics field, developement of VLSI and ULSI has progressed. Miniaturization of radio communication devices, especially, a cellular type portable radiotelephone device used in an automobile telephone system has been optimized. For example, the devices presently used have a volume of the order of 200 cc including a power supply.

There is a possibility that such devices may be further miniaturized down to 100 cc or so in one or two years. Additionally, a radiotelephone device of a size equal to a wristwatch using VLSI and ULSI technique is known, as disclosed in Japanese Utility Model Laid-open Publication Nos. 59-56881 (1984), 1-93851 (1989).

Furthermore, U.S. Pat. No. 4,847,818 discloses a "WRISTWATCH RADIOTELEPHONE". In this patent, the radiotelephone comprises a case 1, straps 4 and 5 mounted on opposite sides of the case 1, a microphone 6 and a speaker 8 at the end thereof, the straps 4 and 5 comprising conductors 13 and 14 for electrically connecting the microphone 6 and the speaker 8 to the radiotelephone body. Accordingly, the productivity yield is poor. In addition, in the state where the straps 4 and 5 are rolled up during use, the microphone 6 and the speaker 8 are positioned close to each other, producing feedback between the transmitter and receiver.

SUMMARY OF THE INVENTION

It is an object of this invention to provide an ultra small portable radiotelephone device having excellent portability, operability and productivity yield which may be suitably used for automobile telephone systems or the like such as a micro cell form and a digitalized form.

It is a further object of this invention to provide an ultra small portable radiotelephone device which overcomes a shorting of ground potential resulting from miniaturization.

It is a still further object of this invention to provide a portable radiotelephone device exhibiting excellent telephone conversation performance without producing feedback between a transmitter sound and a receiver sound.

For achieving the aforementioned objects, a portable radiotelephone device of the present invention comprises a radio device body provided on a strap mounted on an arm of a user in the form of a wristwatch, said strap being provided with a power supply and an antenna for said radio device body, and a voice transmission tube provided on said strap, said tube being connected to a transmitter or a receiver of said radio device body, said voice transmission tube being opened at a predetermined position of said strap.

DETAILED DESCRIPTION OF THE PREFERRED EMBODIMENTS

Figure 2:
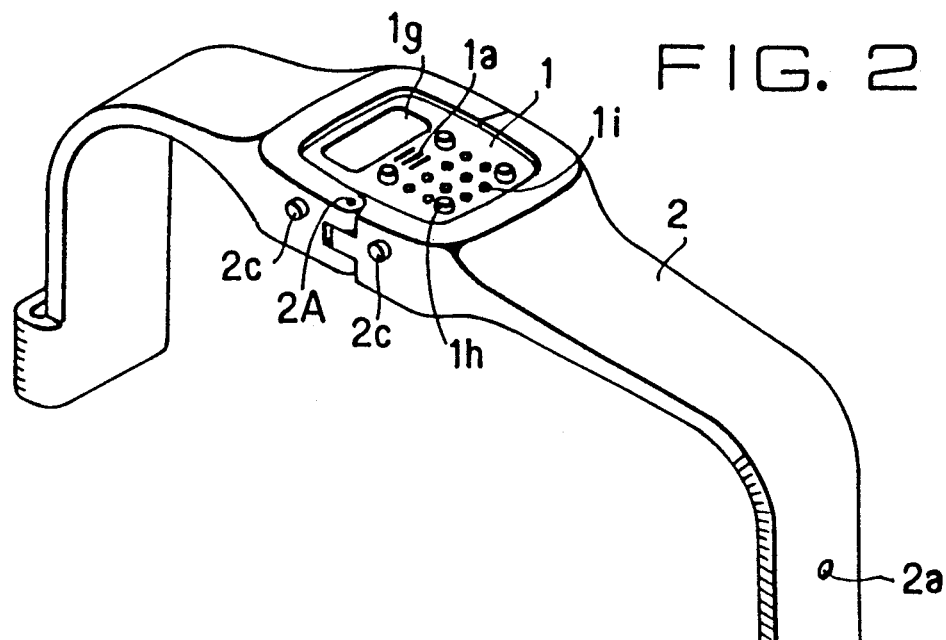
FIG. 2 is a perspective view showing the structure of a portable radiotelephone device according to one embodiment of this invention.
Figure 3:
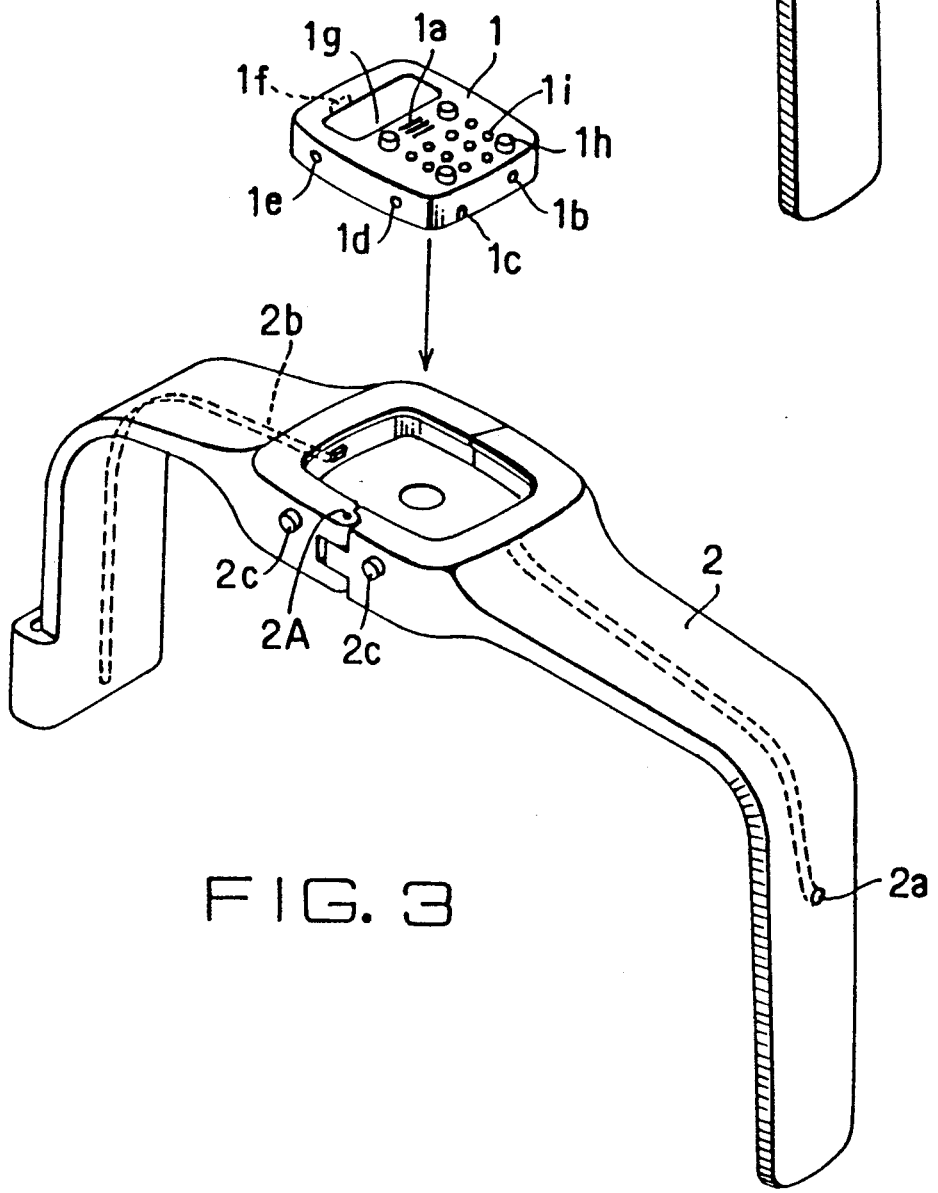
FIG. 3 is an exploded perspective view of the device of FIG. 1.
Figure 4:
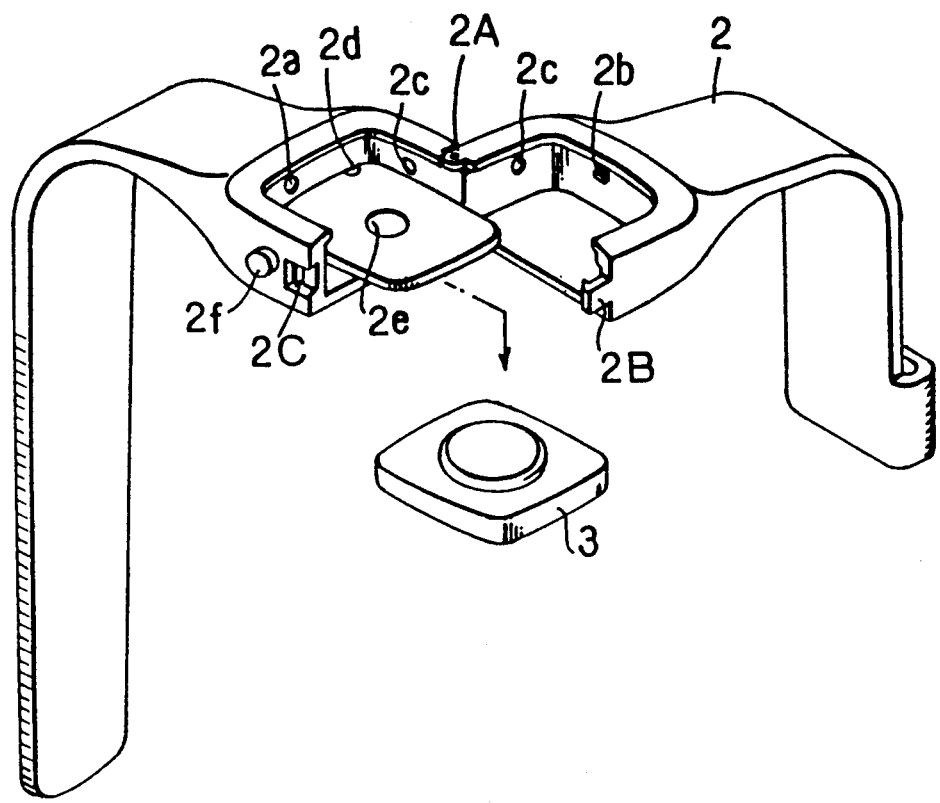
FIG. 4 is an exploded perspective view showing a battery removed and with a strap developed.

Preferred embodiments of this invention will be described hereinafter in detail with reference to the accompanying drawings. In FIGS. 2 to 4, reference numeral 1 designates a radiotelephone body; 1a is a receiver also serving as a call ringer provided on the upper surface of the body 1 to generate a call sound; 1b is a transmitter, 1c is a power supply connector; 1d, 1e are side operating buttons; and 1f is an antenna terminal for connection of an antenna, these elements 1b, 1c, 1d, 1e and 1f being provided on the side of the body 1. Reference numeral 1g designates a display utilizing a liquid crystal; 1h is a main operating button which is often used; and 1i is a sub-operating button which is not often used and having a smaller size than that of the main operating button 1h, these elements 1g, 1h and 1i provided on the upper surface of the body 1.

Reference numeral 2 designates a strap for mounting the radiotelephone body 1 on an arm of a user in the form of a wristwatch. The body 1 and a battery (power supply) 3 (FIG. 4) are designed as a unit which is detachably mounted on the strap 2.

The strap 2 is separable about a shaft 2A. When the body 1 and the battery 3 are mounted on or removed from the strap 2, the strap 2 is split about the shaft 2a and spread open as shown in FIG. 4, whereas when closed, engaging portions 2B and 2C are engaged with each other so that the strap 2 becomes locked in the closed state.

When the body 1 and the battery 3 are mounted on the strap 2, they are held between the upper side and the lower side, respectively, of the strap 2.

As shown in FIG. 3, reference numeral 2a designates a sending speech voice transmission tube (voice transmission tube) which is embedded in the strap 2, terminating in the vicinity of an end of the strap 2 for a fixed length and connected to the transmitter 1b of the body 1; 2b is an antenna which is embedded in the strap 2 and connected at its end to the antenna terminal 1f of the body 1; 2c are operation relay buttons for indirectly operating the side operating buttons 1d and 1e of the body 1; 2d, 2e are power supply connectors connected to the battery 2 in order to supply power to the body 1; and 2f is a unlocking button for releasing an locked state between the engaging portions 2B and 2C when the strap 2 is spread as shown in FIG. 4.

Figure 5:
FIG. 5 is a perspective view showing a state of use.

FIG. 5 shows a user who is talking over the telephone by use of the device according to the present embodiment.

In constructing the radiotelephone body 1, the elements involved in terms of miniaturization are the antenna 2b, the display 1g, the operating buttons (see reference numerals 1h, 1i, and 2c), the sounding parts (see reference numerals 1a and 2a), and the power supply (see reference numeral 3).

As for the display 1g, a relatively small product such as a liquid crystal display of a wristwatch is obtainable. In the present embodiment, the operating portions include the side operating buttons 1d, 1e utilizing the side of the body 1, the main operating button 1h utilizing the upper side of the body 1, the sub-operating button 1i and the like, which can be operated according to the frequency and emergency of operation.

In the present embodiment, the side operating buttons 1d and 1e are for the operation of a wristwatch function, and the main operating button 1h is for start of a call, reception of a call, termination of a call function switching, power supply switch ON/OFF and the like, which are formed and arranged in a size large enough to be operated by the fingers. On the other hand, the sub-operating button 1i is provided to input numerals and alphabet characters and to perform other special functions. The button 1i is operatively connected to the function switching button to provide inputs and reservations. The button 1i is formed and sized for pen point operation for miniaturization.

While in the present embodiment, the sub-operating button 1i is used for input operations, it is to be noted that a transparent switch sheet or the like can be provided on the display 1g so that the input and other operations may be performed by use of the sheet. It is also noted that an auto dialer function, a voice recognition function and the like may be provided in order to simplify the operation and enhance the convenience of the device.

The antenna 2b comprises more significant portion of the device as the instrument becomes smaller in size. It is extremely difficult for the antenna 2 to be built in the body 1 in view of the required antenna efficiency, the mixing-up of receiving and transmission, miniaturization, productivity and the like.

Therefore, in the present embodiment, the antenna terminal 1f is provided as an external terminal on the side of the body 1. The antenna terminal 1f is connected to the antenna 2b embedded in the strap 2 to thereby secure the effective antenna efficiency. The antenna 2b is formed of a conductive film and transferred when the strap 2 is injection molded, the antenna 2 being covered by double molding. Therefore, the antenna 2b can be molded in various patterns in plane, making it possible to adjust to a high antenna efficiency in dependency on the circumstances. In addition, if a grounding pattern is formed in the direction opposite the antenna 2b as needed, it is possible to overcome a short of ground potential resulting from miniaturization of the body 1. The strap 2 needs to be wound around an arm of a user and bended. However, an elastomer as a molding material sufficiently protects the antenna pattern to withstand bending over a long period of time.

The sound functions necessary at minimum for a telephone include the call notifying function at the time of reception, the speech function at the time of conversation and the receiving function.

Figure 1:
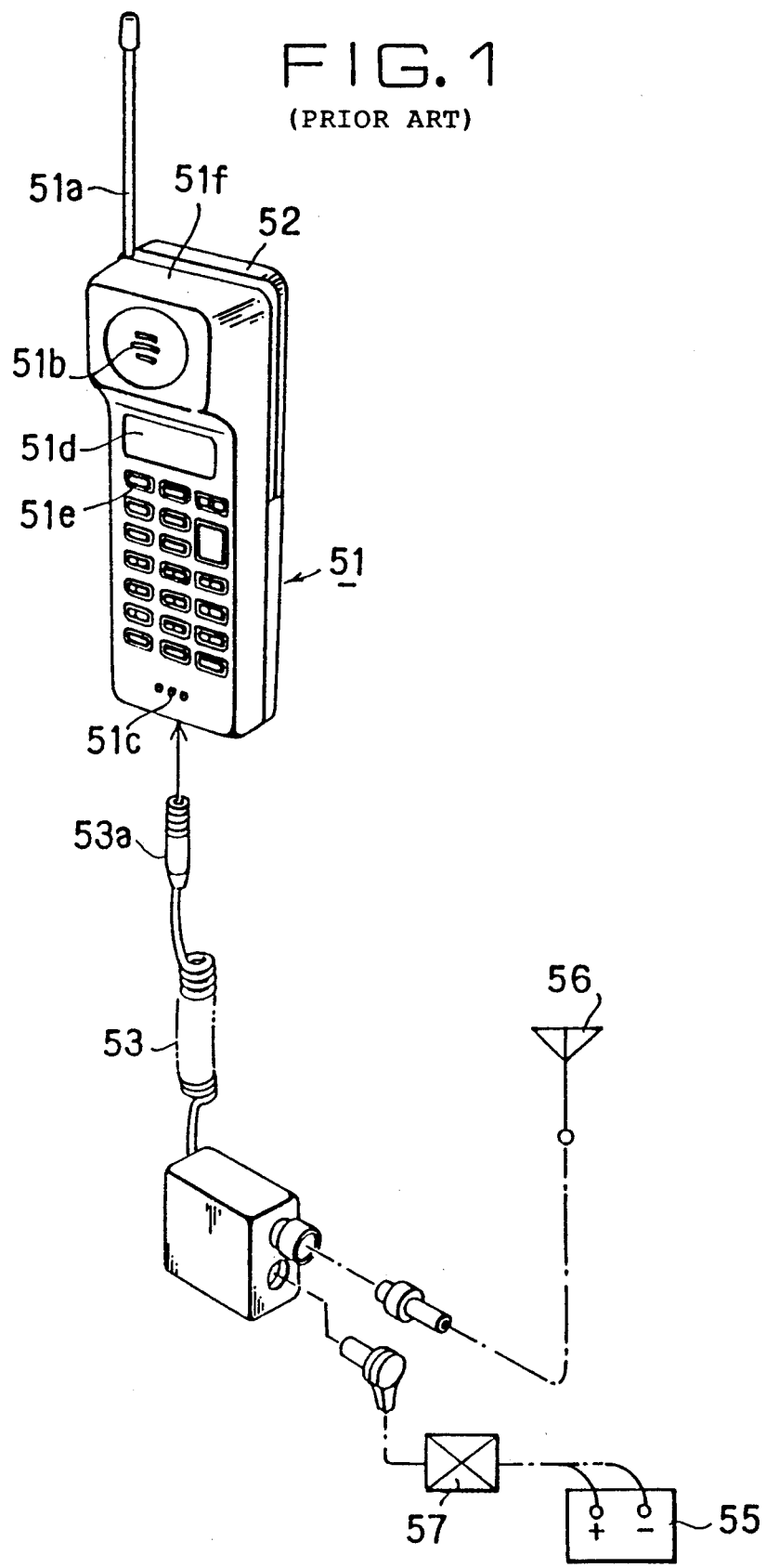
FIG. 1 is a perspective view showing a structure of a conventional portable radiotelephone device.

The conventional radiotelephone device is relatively large in shape and has a great weight and therefore can not be worn by the user. Accordingly, it was necessary that a call sound be heard even from a far location, and a buzzer or the like was used separately from a receiver for telephone conversation (see the reference numeral 51 in FIG. 1). In this case, since the receiver is put on the ear, the call notifying volume will be a minimum condition for protecting the ear.

Specifically, the call function is performed by the receiver 1a to eliminate the buzzer heretofore used.

Since the call sound at the time of calling is low in level as previously mentioned, even if the call sound occurs in the state where the receiver is put on the ear, as shown in FIG. 5, the eardrum of an user is not damaged by the call sound.

Moreover, since the strap 2 is designed so as to envelope the body 1, when the receiver is put on the ear as shown FIG. 5, the sound collecting effect is enhanced. The shape of the strap 2 is suitably formed whereby the strap 2 is made to resonate with the call sound from the receiver 1a to adjust a volume of sound. Moreover, the volume of sound is gradually varied from small to large level or the rumbling period is varied from low to high level whereby the call sound can be received without making noises in the environs and positively even in quiet or noisy places.

The sending speech function needs to be completely independent from the receiving function and separated therefrom acoustically and electrically. However, when the radio device body 1 is miniaturized as shown in FIG. 3, the interior of the receiver 1a may cause sound to travel to the transmitter 1b to impair normal telephone conversation.

Furthermore, since there is a substantially fixed spacing in terms of human dimensions between the ear and the mouth of a user, it is absolutely necessary to arrange the receiver and the transmitter close to the ear and the mouth of the user.

In view of the above, in the present embodiment, part of the strap 2 is provided with the sending speech voice transmission tube 2a by making use of a double molding of the elastic molding material of the strap 2. One end of the tube 2a is placed in close contact with the transmitter 1b in the state where the body 1 is incorporated in the strap 2 so that the voice may enter only from the other end of the tube 2a which terminates in the vicinity of the end of the strap 2.

With this arrangement, the transmitter can be freely arranged to overcome a problem of feedback and can extremely simplify the construction of the body 1.

On the other hand, the battery 3 as an energy source is an important part among main parts constituting the portable radiotelephone device. The battery 3 may be a primary battery, a secondary battery, a solar battery and the like. With the miniaturization of the portable radiotelephone device, products of high density and high performance have been developed and studied. A limit of the secondary battery having a relatively good economical efficiency contemplated at present has an energy density per liter in the range of from 300 to 400 Watt Hours. Therefore, it is inevitable for future portable radiotelephone devices to supply a variety of replaceable batteries to meet the demand of users. This is contrary to the formation of ultra LSI and the enhancement of productivity on the radiotelephone device body 1 side. In the present embodiment, the battery 3 is mounted on the side of the strap 2, and power is supplied to the body 1 through the power supply connectors 2d and 2e.

Needless to say, a backup power source is taken into consideration so as not to erase data within a memory of the body 1 during a short-period power interruption when a battery is replaced, and in case of using a secondary battery, the battery can be charged from the outside. In the present embodiment, the battery 3 can be easily removed from the strap 2 as shown in FIG. 4, in a manner similar to the body 1, and can be replaced simply. In this case, preferably, a solar battery as the aforesaid backup power source may be provided on a suitable location of the strap 2.

As described above, according to the device of the present embodiment, the antenna 2b in conflict with miniaturization, the voice function (sending speech voice transmission tube 2a) requiring distance from the receiver in terms of human anatomy and the battery 3 which involves many variable elements due to the varieties available are constructed to be put into the strap 2 by which the portability is enhance, and the calling function is performed by the receiver 1b. Therefore, it is possible to secure the antenna 2b which is high in antenna efficiency and is substantially unbreakable. It is possible to enhance the miniaturization and productivity of the body 1 and the whole device while preventing the mixing-up of the transmission sound and receiving sound, thus obtaining a portable radiotelephone device which is extremely high in portability, operability and productivity.

Figure 6:
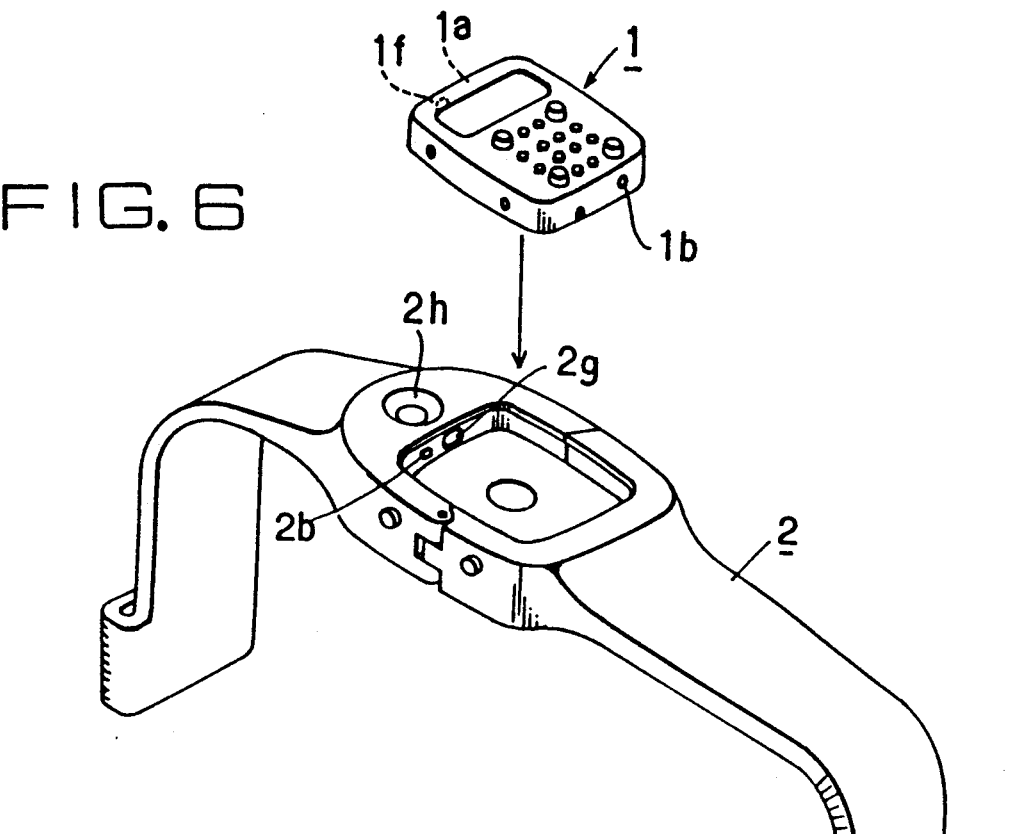
FIG. 6 is an exploded perspective view showing a structure of a portable radiotelephone device according to another embodiment of this invention.

While in the above-described embodiment, a description has been made of the case where the receiver 1i is provided on the upper surface of the radio device body, it is to be noted that as shown in FIG. 6, the receiver 1a may be provided on the side of an body 1, and the ear piece 2h on the strap 2 side and the receiver 1a on the body 1 side may be connected by a voice transmission tube 2g provided on the strap 2. In this case, it is possible to more positively prevent the mixing-up of transmission sound and receiving sound, and this can be made in correspondence to the change in shape.

Figure 7:
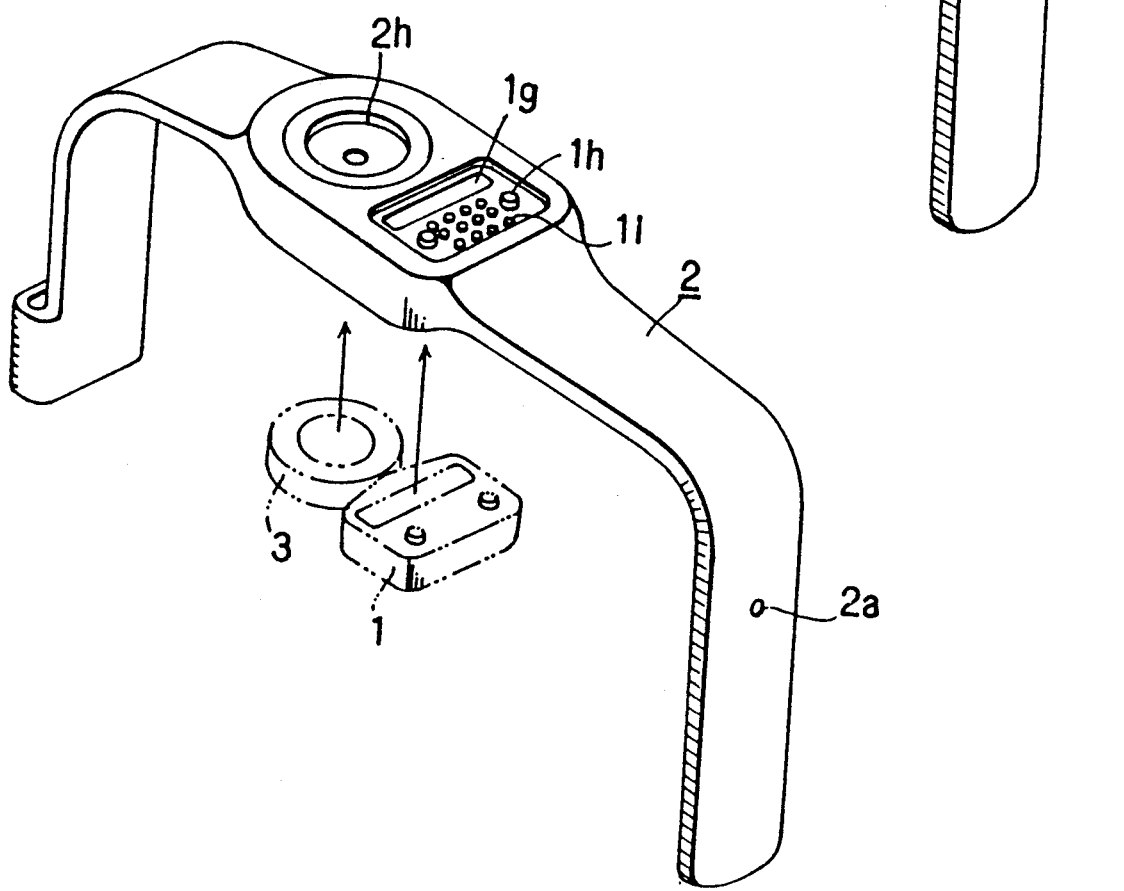
FIG. 7 is a perspective view showing the structure of a portable radiotelephone device according to still another embodiment of this invention.
Figure 8:
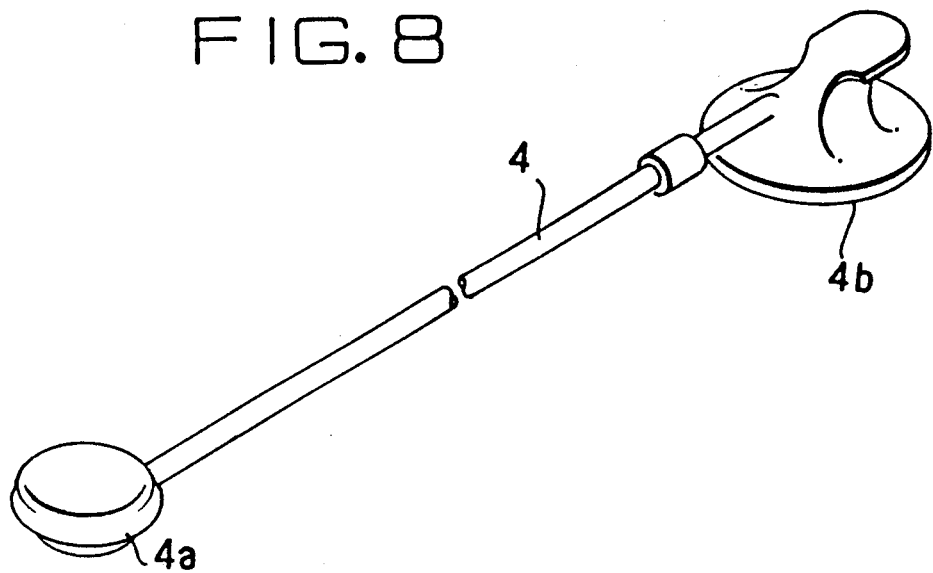
FIG. 8 is a perspective view showing an auxiliary voice transmission tube.
Figure 9:
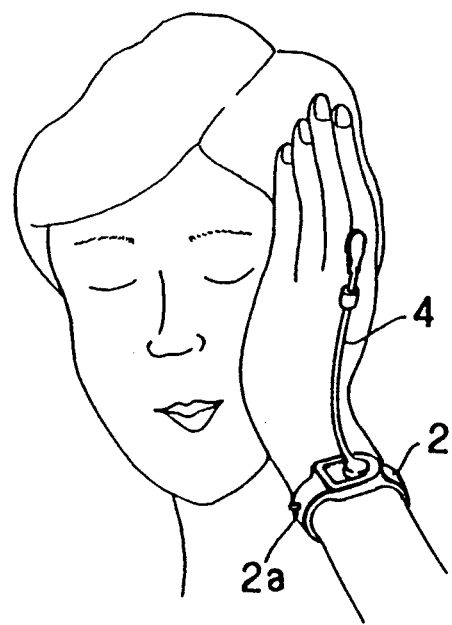
FIG. 9 is a perspective view showing a mode of use of the auxiliary voice transmission tube.

FIG. 7 shows an example in which the shape of the ear piece 2h is formed into an exact shape of a resonant tube. The battery 3 is arranged on the lower side of the ear piece 2h. Thereby, if a coupling portion 4a in the auxiliary voice transmission tube 4 shown in FIG. 8 is coupled to the ear piece 2h, a user with a portable radiotelephone device attached to his arm can put a hearing aid 4b at the end of the tube 4 on the ear to talk over the telephone, as shown in FIG. 9. Of course, FIG. 8 shows one example. The coupling portion 4a may be of the shape in which the former is coupled to the whole portion of the radio device body 1 shown in FIG. 2.

While in the above-described embodiment, the shape of the battery 3 illustrated has been of the button type, it is to be noted that a small cylindrical one can be arranged around the strap 2 to disperse the weight and increase the volume. It is further noted that heat transfer toward the battery 3 is taken into consideration for radiation of the body 1 and good heat conductive metal is integrally or double-molded within the strap 2 in order to improve radiation and antenna characteristic, as necessary.

In the embodiments shown in FIGS. 2 to 5, the receiver 1a is built in the radio device body 1. However, arrangement of the receiver 1a on the strap 2 side when the ear piece 2h is in large size and conversely, arrangement of the transmitter 1b on the strap 2 side, as shown in FIGS. 6 and 7, are included in the scope of the present invention. Needless to say, when the device is used in a vehicle or used in the home, the system can be enlarged in accordance with the present invention.

As described above, according to the present invention, the antenna, the power source and the voice transmission tube for voice function necessary for the distance in terms of human dimensions are put into the strap. Therefore, the miniaturization and productivity of the radio device body and the whole device can be enhanced while securing the antenna which is high in antenna efficiency and hard to be broken and while preventing the mixing of the sending speech sound and receiving sound. There is an effect capable of obtaining a device which is extremely high in portability, operability and productivity and capable of providing telephone conversation whenever and wherever needed.

Furthermore, an antenna is provided on the strap on one side from the radio device body and a grounding pattern is provided on the strap on the other end, thereby overcoming a short of ground potential resulting from miniaturization of the device body.

Moreover, a coupling portion of a bar-like auxiliary voice transmission tube is coupled to an ear piece on the strap side whereby a user can talk over telephone in the mode where the user wears the portable radiotelephone on the arm.

What is claimed is:

1. A portable radiotelephone device in which a radio device body is carried in the form of a wristwatch with a carrying strap, said radiotelephone device comprising:
    a power source portion and an antenna portion for said radio device body provided on said carrying strap; and
    a voice transmission tube connected to a transmitter or a receiver of said radio device body, provided within said carrying strap and terminating at a predetermined position of said carrying strap.

2. The device according to claim 1, wherein a mounting portion for said radio device body of said carrying strap is capable of being opened and closed in a split form about a rotational shaft.

3. A portable radiotelephone device in which a radio device body is carried in the form of a wristwatch with a carrying strap, said radiotelephone device comprising:
    a power source portion for said radio device body provided on said carrying strap;
    an antenna provided on the carrying strap at one end side of said carrying strap from said radio device body and a ground potential provided on the carrying strap at the other end side thereof; and
    a voice transmission tube connected to a transmitter or a receiver of said radio device body, provided within said carrying strap and terminating at a predetermined position of said carrying strap.

4. A portable radiotelephone device in which a radio device body is carried in the form of a wristwatch with a carrying strap, said radiotelephone device comprising:
    a power source portion and an antenna portion for said radio device body provided on said carrying strap;
    a voice transmission tube connected to a transmitter of said radio device body, provided within said carrying strap and terminating at a predetermined position of said carrying strap;
    an ear piece connected to a receiver of said radio device body and terminating at a predetermined position of said carrying strap; and
    an auxiliary voice transmission tube coupled to said ear piece.

* * * * *